United States Patent
Goetz et al.

(10) Patent No.: US 9,496,799 B2
(45) Date of Patent: Nov. 15, 2016

(54) ELECTRICAL CONVERTER SYSTEM

(75) Inventors: Stefan M. Goetz, Forstern (DE); Thomas Weyh, Munich (DE)

(73) Assignee: Technische Universitaet Muenchen, Munich (DE)

( * ) Notice: Subject to any disclaimer, the term of this patent is extended or adjusted under 35 U.S.C. 154(b) by 148 days.

(21) Appl. No.: 14/235,812

(22) PCT Filed: Jun. 28, 2012

(86) PCT No.: PCT/EP2012/002727
§ 371 (c)(1),
(2), (4) Date: Jan. 29, 2014

(87) PCT Pub. No.: WO2013/017186
PCT Pub. Date: Feb. 7, 2013

(65) Prior Publication Data
US 2014/0226377 A1   Aug. 14, 2014

(30) Foreign Application Priority Data

Jul. 29, 2011   (DE) .................. 10 2011 108 920

(51) Int. Cl.
*H02M 7/483* (2007.01)
*H02M 7/00* (2006.01)
(Continued)

(52) U.S. Cl.
CPC ............. *H02M 7/003* (2013.01); *H02M 3/158* (2013.01); *H02M 7/483* (2013.01); *H02M 7/493* (2013.01); *H02M 2007/4835* (2013.01)

(58) Field of Classification Search
CPC ................. H02M 3/158; H02M 7/483; H02M 7/493; H02M 2007/4835; H02M 7/003
(Continued)

(56) References Cited

U.S. PATENT DOCUMENTS 5,483,433 A   1/1996   Yang
5,761,058 A   6/1998   Kanda et al.
(Continued)

FOREIGN PATENT DOCUMENTS

DE   4203882 A1   9/1992
DE   10217889 A1   11/2003
(Continued)

OTHER PUBLICATIONS

Machine Translation of Patent document, WO 0105022 A1, Gonzalez Corro Ivan. Jan. 2001.*
(Continued)

*Primary Examiner* — Jessica Han
*Assistant Examiner* — Bart Iliya
(74) *Attorney, Agent, or Firm* — Eschweiler & Associates, LLC

(57) ABSTRACT

The present invention relates to an electrical converter for power supply, which is constructed from individual modules. Each of the identical modules includes a module capacitor and can be switched by switching elements such that the module capacitors of the modules may be connected in series or in parallel, or a current flow takes place through the modules without charging or discharging the module capacitor. In this manner, the voltage can be connected across the terminals of the converter by a corresponding control of the switching elements in stages with low loss levels. According to the invention, the voltages of these capacitors are adjusted with respect to each other by load balancing prior to parallel connection of the capacitor modules so that the corresponding losses are minimized.

17 Claims, 11 Drawing Sheets

(51) Int. Cl.
*H02M 3/158* (2006.01)
*H02M 7/493* (2007.01)

(58) Field of Classification Search
USPC .......................................................... 363/60
See application file for complete search history.

(56) References Cited

U.S. PATENT DOCUMENTS

| | | | |
|---|---|---|---|
| 6,954,366 | B2 | 10/2005 | Lai et al. |
| 7,269,037 | B2 | 9/2007 | Marquardt |
| 7,755,918 | B2 | 7/2010 | Barbosa et al. |
| 7,817,451 | B2 | 10/2010 | Barbosa et al. |
| 2011/0013441 | A1* | 1/2011 | Gruber ................... H02M 1/36 363/154 |
| 2011/0019449 | A1* | 1/2011 | Katoh ................... H02M 1/088 363/124 |
| 2011/0032738 | A1 | 2/2011 | Skinner et al. |
| 2011/0096580 | A1* | 4/2011 | Asplund ................... H02J 3/36 363/132 |
| 2011/0291582 | A1 | 12/2011 | Wei et al. |
| 2013/0200860 | A1* | 8/2013 | Takeda ................. H02J 7/0024 320/167 |
| 2014/0049230 | A1 | 2/2014 | Weyh |

FOREIGN PATENT DOCUMENTS

| | | |
|---|---|---|
| DE | 102010052934 A1 | 5/2012 |
| EP | 1976107 A1 | 10/2008 |
| WO | 03090331 A2 | 10/2003 |
| WO | 2008046772 A1 | 4/2008 |
| WO | 2012072168 A2 | 6/2012 |

OTHER PUBLICATIONS

Machine Translation of Patent document, CN 102130619 A, Wenjin Li, Jul. 2011.*
Grandi, et al. "Dual Inverter Space Vector Modulation with Power Balancing Capability.", IEEE, 2009, pp. 721-728.
Barnes et al. "Implementation of a Three-Phase Multilevel Boosting Inverter Using Switched-Capacitor Converter Cells." IEEE, 2010, pp. 2141-2147.
International Search Report and Written Opinion of the International Searching Authority dated Mar. 12, 2014 for International Application No. PCT/EP2012/002727.
Non-Final Office Action dated Jul. 8, 2015 for U.S. Appl. No. 13/990,463.
Non-Final Office Action dated Feb. 1, 2016 for U.S. Appl. No. 13/990,463.
International Preliminary Report on Patentability dated Jul. 10, 2013 for International Application No. PCT/EP2011/005385. 14 Pages.
International Search Report dated May 3, 2013 to Patent Application PCT/EP2011/005385.
G. Gateau, et al.; "Stacked Multicell Converter (SMC): Topology and Control"; EPE 2001-Graz; 2001; p. 1-10.
Notice of Allowance Dated Jul. 15, 2016, U.S. Appl. No. 13/990,463.

* cited by examiner

ELECTRICAL CONVERTER SYSTEM

The invention relates to an electric converter system and corresponding method. Converters of such kind can be used in a very wide range of applications. For example, they can be used to ensure the controlled supply of power to electric machines, and also for integrating DC electricity sources (battery storage devices, solar power installations) in an AC power network. As a rule, previous modular multilevel converter topologies have only operated with modules and their energy storage devices connected in series, in which arrangement capacitors are typically used as energy storage devices.

BACKGROUND OF THE INVENTION

Semiconductor power converters, in the form of power controllers, for example, have fulfilled a key function in power electronics for years. Their field of application covers all power classes. In motors, mechanical commutators were replaced by electronic circuits, transformers became unnecessary in many applications, or components of the same size exceeded the power flow they provided by orders of magnitude (by generating higher frequencies). Many different applications only became feasible or financially viable with the advent of electronic conversion. This was true of distributed feed to the local grid with photovoltaic systems as well as DC power transmission and coupling with AC voltage networks with higher power flow (without the use of mechanical motor-generator sets).

Even so, these systems are still hindered by a number of problems that have yet to be solved satisfactorily. Linear controllers are not usable even with medium power flows because of their substantial energy losses. On the other hand, the use of clocked circuit diagrams in conjunction with current- or voltage-limiting components with first order dynamics causes the generation of huge harmonic waves and not only simultaneous emission by precisely said components, but also oscillations that propagate on lines themselves. In particular, various power semiconductors, such as SCR and GTO, become very unstable in response to fast voltage dynamics. Commutation problems in hub converters or breakover firing in thyristors demand extremely sophisticated filter equipment, which typically work with the conversion of higher harmonics into heat.

In addition, power semiconductors can only be manufactured and used practically for relatively low voltages of a few kilovolts. Where voltage, output, harmonic components, distortion and particularly failure safety must satisfy stricter requirements, the focus is trained almost exclusively on multilevel converter systems. The generally known modular variant, the modular multilevel converter as described in greater detail in DE 102 17 889 A1 is unrivalled in this field.

This converter system is able to convert practically any time-related voltage curves from the terminal pairs on one side into equally diverse profiles between the terminal pairs on the other side, without having to differentiate between an input and an output based on its working principle. With this modular multilevel converter, each phase of the converter is constructed from a multiplicity of identical single modules connected in series. Each individual module functions as a two-terminal network and contains an energy storage element in the form of a capacitor, and a plurality of switching elements that can optionally absorb or emit power for both voltage directions, and can thus reach all four quadrants of the current-voltage graph. In particular, these individual modules can be switched to the following four states via their switches:

Specification of a positive terminal voltage with any current direction;

Specification of a negative voltage with any current direction;

Bypass state (that is to say no energy absorption or emission by the individual module), free current flow in any direction;

Forced energy absorption by the individual module by imposing the voltage level.

Such an individual module is thus—with corresponding control for example with clocked switching of the active elements (perhaps analogously with pulse width modulation)—already capable of controlling its own energy absorption and emission without restriction and approximately simulating a virtual load with certain properties to a source. These modules can now be interconnected for full four-quadrant operation for n sources (for example two incoming voltage systems) and m outputs (for example a three-phase low-voltage system) depending on the desired application.

A combination of two series connections, each consisting of z modules is called a phase module, wherein each of the two series connections forms a bridge branch. The number z of modules in each bridge branch defines voltage and harmonic properties of the converter. The phase modules in turn form the base modules of a single- or multiphase converter. Thus, for example, with two interconnected phase modules one system can be used to convert a 1-phase AC voltage or DC voltage to another 1-phase AC voltage or DC voltage. Such a system is configured entirely symmetrically with regard to inputs and outputs, and thus enables full four-quadrant operation with respect to each connection pair. Moreover, the behaviour of the current converter in terms of inductive or capacitive action can be adapted individually at both the input and the output sides. Consequently, energy can also flow in both directions, and can be changed dynamically.

Additionally, a system for converting a 3-phase AC voltage to a 1-phase AC voltage or DC voltage, for example, can be created with three interconnected phase modules. The combined connections of the phase modules may also be thought of as a (DC voltage) conductor rail, so that the interconnection of n+m phase modules creates a grid link for connecting an n-phase grid to an m-phase grid.

Despite the enormous advantages of the aforegoing, including—with no claim as to completeness—excellent failure safety due to the integrated redundancy configuration, automatic voltage symmetrisation of modules and semiconductors theoretically already in place, full four-quadrant operation, firmly defined maximum required blocking voltages for all semiconductors well below the maximum voltage of the terminal pairs for the overall system, even this topology still has a few problems that are not satisfactorily resolved. Some of these weaknesses, such as the immense design effort required, will be overcome with the art described in patent application DE 10 2010 052 934.6, which has not been published at the time of filing of the present application. The improvement described here already offered the ability to use the new modules and their storage capacities more effectively by virtue of the additional switching states, and possibly even to enable a charge balance between the modules. However, this last was not a primary objective.

Said currently unpublished application DE 10 2010 052 934.6 describes a special variant of the modular multilevel converter, which is also constructed from multiple individual modules, but is also designed so that the capacitors used as energy storage elements can be connected either in parallel or in series. In this context, the individual modules are arranged in such manner that the energy storage elements can be connected either in parallel or in series via internal circuit elements, so that no additional external switches are needed, as for matrix addressing.

At the same time, this described art ensures that the voltage load of the internal switching elements is not significantly greater than the maximum voltage of the capacitors.

The fundamental advantage of such an optional interconnection consists in that parallel connection of the energy storage elements in the individual modules can reduce the total internal resistance of the converter (or of a branch of the converter), so that the converter in this switching state is able to provide several times more power than is possible for conventional converters with low output voltages. This also enables the size of the capacitors in the individual modules to be reduced, depending on the use case. Moreover, such a system can also increase DC- and AC voltages extremely efficiently from the source to the load in converter mode, if many module capacitors are connected in parallel for taking up energy from the source, and if the same capacitors are then correspondingly connected in series for delivering the energy.

However, in this circuit the problem of a lossy charge balance may occur. In this converter variant, individual module capacitors should preferably only be switched from serial mode to parallel mode if the individual voltages of the capacitors that are to be connected in parallel are the same. Otherwise, charge balancing will take place, involving energy losses as illustrated in the following example:

It is assumed that modules have two capacitors 1 and 2, wherein the first capacitor has capacitance $C_1$ and voltage $U_1$, a second capacitor has capacitance $C_2$ and voltage $U_2$.

When both modules, or the capacitors thereof, are connected in parallel, a new capacitance is obtained: $C_{tot}=C_1+C_2$.

At the same time, however, charge $Q_{tot,\ new}$ of the total system must be maintained, so that the new charge is obtained from the total of the two partial charges of capacitors $C_1$ and $C_2$:

$$Q_{tot,new}=Q_1+Q_2=C_1 \cdot U_1+C_2 \cdot U_2$$

This total charge can be used on the one hand to calculate the voltage of the system with capacitors connected in parallel, by the $$U_{new} = \frac{Q_{tot,new}}{C_{tot}} = \frac{C_1 \cdot U_1 + C_2 \cdot U_2}{C_1 + C_2};$$

and on the other hand the energy stored $E_{tot}$ in the system with capacitors connected in parallel can be calculated with:

$$E_{tot} = \frac{1}{2} C_{tot} \cdot U_{tot}^2 = \frac{1}{2} \frac{(C_1 \cdot U_1 + C_2 \cdot U_2)}{C_1 + C_2}$$

If $U_1 \neq U_2$, this energy is less than the energy that was stored previously in the individual capacitors:

$$E_{tot} \leq \frac{1}{2} C_1 \cdot U_1^2 + \frac{1}{2} C_2 \cdot U_2^2$$

The difference in energy between this and the energy that was stored in the capacitors previously is calculated with $$\Delta E = \frac{1}{2} \cdot \frac{C_1 \cdot C_2}{C_1 + C_2} \cdot \Delta U^2,$$

where $\Delta U$ represents the difference between the two capacitor voltages. This energy difference is lost during the parallel switching process and is dependent on the square of the voltage difference between the capacitors.

For example, if the capacitors are connected in parallel via a resistor, this energy difference in the resistor is converted into heat. Since the energy difference is not dependent on the value of the resistor, only the current, the output and the charge reversal time are changed by different resistor values.

Specifically in the converter circuits described, however, a parallel connection operation of such kind would have to be performed with very small (protective) resistors, because otherwise the resistors—which are permanently located in the current path of the converter—lead to significant losses by the current converter. This in turn creates high charge reversal currents, which can place a heavy load on the semiconductor switch of the converter.

For a system consisting of n modules to be connected in parallel, a voltage obtained correspondingly after the parallel connection is calculated as follows:

$$U_{new} = \frac{\sum_i C_i \cdot U_i}{\sum_i C_i}$$

The energy difference $\Delta E_n$ between the sum of the individual capacitor energies and the energy of the system connected in parallel is calculated by:

$$\Delta E_n = \frac{1}{2}\left(\sum_i C_i \cdot U_i^2 - \frac{\left(\sum_i C_i \cdot U_i\right)^2}{\sum_i C_i}\right)$$

In converter according to the art described in application DE 10 2010 052 934.6, which was not published at the time the present application was drafted, it must therefore be ensured that the voltage differences between capacitors to be connected in parallel never become too great during operation, or if they do, they must only connected in parallel very infrequently. Otherwise relatively large energy losses and large balancing currents will occur in the individual modules of the converter.

On the other hand, if such a modular converter is to be used as widely as possible, it will almost inevitably entail voltage differences between the module capacitors, since on the one hand it is practically impossible to ensure that the same charge is applied to or drawn from all capacitors involved using one converter controller; furthermore, even the—occasionally substantial—capacitance tolerances of their module capacitors result in corresponding voltage differences.

Precisely in systems with large module voltages and fast clock speeds and/or frequent changing of the module capacitors from serial to parallel connection, this causes unnecessarily high charge reversal losses.

SUMMARY OF THE INVENTION

In view of the preceding, the problem addressed by the present invention is to provide charge balancing for the capacitors of a modular converter that are capable of switching from serial to parallel operation in such manner that the corresponding capacitor voltages are balanced with each other with low losses immediately before the capacitors are connected in parallel. By such means, it should be possible to connect in parallel optionally at least two and a maximum of all capacitors of a bridge branch in such a modular converter.

This problem is solved according to the invention with an electric converter system according to claim 1 or 4, and with a method for actuating a converter to control currents and voltages according to claim 16 or 17. The subordinate claims define preferred and advantageous embodiments of the present invention.

The invention is based on the understanding that on the one hand a modular converter system in which the storage capacitors can be connected optionally in parallel and in series offers considerable advantages, and on the other hand that these advantages can only be exploited fully if the corresponding capacitor voltages are balanced with each other for a planned switching of the storage capacitors to parallel connection.

In the context of the present invention, an electric converter system for electricity supplies is provided, consisting of at least two modules of the same kind connected consecutively also referred to a "cascaded connection" in the following. Each module comprises at least four connections enabling it to be connected with its neighbouring module(s) to the left and the right via at least two connections for each. Each module further comprises at least one module capacitor for storing energy and switching elements. The two connections of the module capacitor may be connected electrically to the respective connections of the module via these switching elements. In this way, the module capacitors of the modules may be connected optionally both in series and in parallel via the switching elements. In particular, individual module capacitors of the converter may be connected in series while other module capacitors are connected in parallel, so that the serial connection created is also arranged in series with the parallel connection that is also created. In addition, individual module capacitors may also be isolated from the connection arrangement by corresponding adjustment of the switching elements, so that the corresponding modules provide a connection between the modules on either side of them, but their own module capacitor is not charged or discharged thereby.

Additionally, intermediate modules of the same kind consisting of at least one inductor for storing energy are located between each two adjacent modules, and may include further connections. Adjacent modules are thus each connected to one another electrically via at least one of their connections through the connections of the intermediate modules arranged between them, and may also be connected to each other directly via more of their own connections.

The Intermediate modules and their inductors together with the switching element may serve to ensure the delivery of energy and charges between the module capacitors. In this case, the corresponding switching elements are controlled in such manner that some of the energy of a module capacitor is transferred to an adjacent module capacitor via the inductor of the neighbouring intermediate module. Larger quantities of energy may also be transferred from one module capacitor to the next in small portion via small inductors according to the principle of a switch converter. In particular, in this way the voltages of two or more module capacitors that are to be connected in parallel may be balanced with low loss before parallel connection is made.

Each end point of such a chain arrangement of modules and intermediate modules is formed by a connection on a module in the terminal position or by connecting at least two connections on the module in the terminal position. In this way, a "bridge branch" of a converter may be formed, wherein two bridge branches connected in series each form for example a phase module of a one- or multiphase converter. The voltage at the end points of such a chain arrangement is calculated from the sum of the partial voltages of individual serial and parallel circuits of module capacitors in the chain arrangement.

In order to ensure that charge balancing can take place between capacitors in adjacent modules, the switching elements cooperate with the inductor of the respective intermediate module and the capacitors in the manner of a switch converter. For example, an electrical circuit between a first capacitor and the inductor can be completed via the switching elements, so that the current flow in the inductor rises. This causes energy to be transferred from the first capacitor to the coil in the form of magnetic field energy. In a further step, an electrical circuit can be completed between the inductor and the second capacitor by corresponding switching, so that the current flow through the coil is not interrupted. The energy of the inductor can now be transferred partially or entirely from the inductor to the second capacitor. If these switching operations are carried out multiple times in succession, a load transfer between capacitors can be assured even when using very small inductors. This charge transfer can be set up either so that the voltages of adjacent capacitors are balanced with each other, or in such manner that the voltage difference between adjacent capacitors is increased. This method is especially useful for balancing the voltages of two module capacitors that are not located in directly adjacent modules. For example, the charge on the corresponding module capacitors $C_A$, $C_B$ and $C_C$ for three consecutively arranged modules A, B and C can be reversed in such manner that the voltages of $C_A$ and $C_C$ are balanced with each other without balancing the voltage von $C_B$. In this case, for example, the charge may be transferred first from $C_A$ to $C_B$ via the intermediate module between A and B, and then onward to $C_C$ via the intermediate module between B and C. In this way, in principle with the device according to the invention, both charge and energy may be transferred from any capacitor to any other capacitor in a chain.

In a preferred embodiment of the present invention, the intermediate modules may consist exclusively of an inductor. Besides the module capacitor, each module according to the invention may also comprise two series circuits of three switching elements each, wherein these series circuits are arranged parallel to the module capacitor. Each of these series circuits thus contains two connection points between two consecutive switches. These form the four connections or terminals of the module, wherein one of each four connections is connected directly to a connection (terminal) of an adjacent module, and one of each of these four connections is connected to the connection of an adjacent module via a connection of the inductor. In addition, a further switching element may also be located parallel to the inductor in the intermediate module, and when switched on, may bridge the inductor.

In a further preferred embodiment of the present invention, the intermediate modules also consist solely of an inductor. Besides the module capacitor, each module according to the invention may also comprise four series circuits of two switching elements each, wherein these series circuits are arranged parallel to the module capacitor. Each of these series circuits thus contains one connection point between two consecutive switches. These form the four connections (terminals) of the module, wherein one of each of these four connections (terminals) is connected directly to a connection (terminal) of an adjacent module, and one of each of these four connections is connected to the connection (terminal) of an adjacent module via a connection (terminal) of the inductor. In addition, a further switching element may also be located parallel to the inductor in the intermediate module, and when switched on, may bridge the inductor.

Alternatively the charge and voltage balancing between the capacitors of the modules may be carried out before the parallel switching, but also in another way, so that no intermediate modules are required. In this case, however, the corresponding modules must be modified with respect to the modules described in the as yet unpublished application DE 10 2010 052 934.6, and the actuation of the switching elements must be changed, as described in the following:

The parallel switching operation is initiated at first when one of the two operating states a) or b) of the electronic converter is detected:
a) Charging of capacitors of the modules with a positive charge current; i.e., the capacitor voltage of the module capacitors concerned is rising.
b) Discharging of capacitors of the modules with a negative charge current; i.e., the capacitor voltage of the module capacitors concerned is falling.

Then, a sequence or order is assigned from the group of module capacitors to be connected in parallel depending on their voltages.

In case a), the capacitor with the lowest voltage is selected and connected via a corresponding switching arrangement of the module switching elements so that it is charged, i.e., its capacitor voltage rises. When the charge voltage of this capacitor reaches the value of the capacitor with the second lowest voltage, said second capacitor is connected in parallel with the first capacitor and charged further. This process is repeated similarly until the capacitor with the highest voltage is also able to be connected in parallel to the overall system.

In case b), the capacitor with the highest voltage is selected and connected via a corresponding switching arrangement of the module semiconductor switches so that it is discharged. When the charge voltage of this capacitor reaches the value of the capacitor with the second highest voltage, said second capacitor is connected in parallel with the first capacitor and discharged further. This process is repeated similarly until the capacitor with the lowest voltage is also able to be connected in parallel to the overall system.

The charge currents by which the capacitors are charged or discharged in this process are usually the same currents by which the converter is operated. Consequently, these currents are typically quite large, so voltages also change very rapidly at the capacitors concerned. Accordingly, the charge balancing described above also takes place very quickly and can easily be completed between two switching cycles of the converter. On the other hand, if the converter current is presently very small—because of the low converter losses—the corresponding parallel connection of module capacitors can also be dispensed with.

With this embodiment of the converter, it should be noted that when the module capacitors are sorted according to their voltage levels, a module capacitor may not necessarily be positioned immediately next to the module capacitor with the next highest (or next lowest) voltage. Therefore, it is essential to ensure that the switching elements of the modules are configured in such a way that the module capacitors can be connected in parallel even if the modules to which they belong are not immediately adjacent; i.e., if one or more modules are positioned between them. The module capacitors of these intermediate modules are not to be integrated in the charging process initially. For this purpose, it is sufficient if a connection of such a module capacitor is released via a corresponding switching element, that is to say it is not connected to the corresponding electrical circuit. At the same time, however, the switching elements of this skipped module must ensure that the current flow is maintained between the modules of which the capacitors are to be connected in parallel.

For a converter of such kind, a measuring circuit may preferably be implemented as well to measure the voltage values of the individual capacitors.

In addition, a control circuit may also be advantageously implemented for such a converter, as a means for placing the measured voltages of the module capacitors in an order assigned to the modules, and for actuating the modules so that the chronological sequence of the parallel connection can be carried out as described in the preceding.

Therefore, a further embodiment of the electric converter system consisting of at least two modules of the same kind connected one after the other is also provided within the scope of the present invention. In this context, each module comprises at least four connections (terminals) via which it can be connected to the adjacent modules on both the left and right using at least two connections (terminals) each. Each module further comprises at least one module capacitor for storing energy and switching elements. Via these switching elements, both connections of the module capacitor can be connected electrically to the respective connections (terminals) of the module. In this way, the module capacitors of the modules can be connected optionally in series or in parallel via the switching element. In particular, individual module capacitors of the converter can be connected in series while at the same time other module capacitors are connected in parallel, so that the serial circuit is in series connection with the parallel circuit that has been created at the same time. In addition, individual module capacitors may also be isolated from the connection arrangement by corresponding adjustment of the switching elements, so that the corresponding modules assure an electrical connection between the modules on either side of them, but their own module capacitor is not charged or discharged thereby. In this case, therefore, a direct electrical connection is established between two modules that are not directly adjacent to one another, by skipping the modules between them, wherein the direct electrical connection must be at least bipolar if module capacitors are to be connected in parallel by skipping over modules that are positioned between them.

Since individual module capacitors can be excluded from the circuit arrangement, it is possible to balance the capacitor voltage in accordance with the charging or discharging strategy described in the following before a planned parallel connection is made between two or more module capacitors.

This charging strategy is implemented immediately under the external current load of the converter (i.e., the chain connection of the modules), so that a first module capacitor in this planned parallel connection is first charged or discharged depending on the direction of the load current through the converter.

This first module capacitor is selected according to whether the load current is charging the capacitor as the module capacitor having the lowest voltage or is discharging the capacitor as the module capacitor having the highest voltage.

Then, a module capacitor to be connected in parallel is selected, in which case either the capacitor having the second lowest voltage is selected if the load current is charging the first module capacitor, or the capacitor having the second highest voltage is selected if the load current through the converter is discharging the first module capacitor.

However, this module capacitor to be connected in parallel is not connected in parallel to the first module capacitor until the load current has charged or discharged the first module capacitor to the point that it has the same voltage as the selected module capacitor to be connected in parallel. In this way, charge losses are avoided during parallel connection of the capacitors via switching elements.

The preceding two steps are repeated until all module capacitors that are to be connected in parallel have been connected to each other in a parallel circuit.

This described balancing of voltages before connecting in parallel can be performed very rapidly, since standard load currents through the converter are relatively large when the corresponding module capacitors are being charged or discharged. In particular, parallel connection of capacitors is especially desirable when the converter is being loaded with very high load currents. Consequently, the voltages can easily be balanced between two switching cycles of the converter.

In a preferred embodiment of the present invention, the modules of the converter system consist of a module capacitor and two series circuits of two switching elements each, in parallel with the module capacitor. Each of these two series circuits thus contains a connection point between two consecutive switches of a series circuit. These two connection points form the two connections of the module with the first adjacent module. In addition, two further connections are created between the module and the second adjacent module each via a further switching element to the upper or lower connection of the capacitor module. In addition, yet another switching element connects the one connection with the first adjacent module to another connection with the second adjacent module, so that a direct electrical connection may be obtained between these two connections via this switching element.

In a further preferred embodiment of the present invention, the modules of the converter system consist of a module capacitor and two series circuits of two switching elements each, in parallel with the module capacitor. Each of these two series circuits thus contains a connection point between two consecutive switches. The connections to the first adjacent module are connected directly to these connection points of these series circuits. Additionally, one of the connections or terminals to the second adjacent module is connected to a corresponding one of these middle points of the series circuits directly while the other one is connected via a further switching element. In this way, a series circuit of modules of the same kind is created, wherein each following module is the mirror image of the preceding module with respect to a horizontal axis of the horizontally represented chain circuit. In other words, the connections to the second adjacent module include the additional switching element thereof at the top or the bottom alternatingly, while the other connection in each case is connected directly with the second adjacent module.

The present invention further includes a method for actuating or controlling a converter for current supplies. In this context, the converter consists of consecutively switched modules of the same kind and intermediate modules of the same kind disposed between the modules. Each module comprises multiple switching elements and at least four connections or "terminals", and includes at least one module capacitor for storing energy. Each intermediate module further includes at least one inductor for storing energy and comprises at least two connections or "terminals". The method comprises the following steps:

Selecting a setting of the switching elements of a module such that optionally either a direct electrical connection is made via one of the connections thereof between a first module adjacent thereto and a second module adjacent thereto, or that the module capacitor of the module is connected in series to a module capacitor of an adjacent module, or that the module capacitor of the module is connected in parallel to a module capacitor of an adjacent module via two connections; and Controlling the switching elements in such manner that the energy and charge can be transported between the module capacitors via the inductors of the intermediate modules according to the principle of a switch converter, so that voltages of module capacitors that are to be connected in parallel are brought to the same value before they are connected in parallel.

The present invention also provides another method for actuating or controlling a converter for current supplies. In this context, the converter consists of consecutively connected modules of the same kind. Each module comprises multiple switching elements and at least 4 connections, and includes at least one module capacitor for storing energy. The method comprises the following steps:

Selecting a setting of the switching elements of a module such that optionally either a direct electrical connection is made via one of the connections thereof between a first module adjacent thereto and a second module adjacent thereto, or that the module capacitor of the module is connected in series to a module capacitor of an adjacent module, or that the module capacitor of the module is connected in parallel to a module capacitor of an adjacent module via two connections, wherein the parallel connection of module capacitors of modules that are to be connected in parallel is carried out beginning with a first module capacitor in the order in which the module capacitors are activated when the converter is in operation, wherein said actuation of the modules comprises the following substeps:

From the module capacitors of the intended parallel connection, selecting the module capacitor with the lowest voltage as the first module capacitor when a load current through the converter charges this module capacitor, or selecting the module capacitor with the highest voltage as the first module capacitor when a load current through the converter discharges this module capacitor;

Selecting a module capacitor to be connected in parallel that has the second lowest voltage when a load current through the converter charges the first module capacitor, or selecting a module capacitor to be connected in parallel that has the second highest voltage when a load current through the converter discharges the first module capacitor;

Connecting this module capacitor intended for parallel connection in parallel with the first module capacitor when the load current through the converter has charged or discharged the first module capacitor to the point that is has the same voltage as the module capacitor that is to be connected in parallel; and Repeating the preceding two steps until all module capacitors that are to be connected in parallel have been connected to each other.

The invention has the following advantages:

The charge balancing between module capacitor charges can be carried out with as little loss as desired.

The design of the electronic components of a module only has to be adapted to the module voltage, which means that converters with enormous dielectric The voltage symmetrisation of the modules is carried out directly via corresponding actuation of the switching elements. Further symmetrisations are not necessary here.

By virtue of the energy storage elements, the circuit topology of the individual modules guarantees overvoltage protection with regard to the inputs/outputs (low-pass effect).

Failure safety through exploitation of redundancies in the control.

The option to connect the energy storage elements optionally in series or in parallel made possible by the configuration according to the invention allows converters to be constructed with a large voltage ratio (and corresponding current ratio) between input and output terminals. Such a system has significantly lower losses than previous converters, since a number of modules are connected in parallel at each of the lower voltages. The Ohmic losses particularly of the energy storage elements, but also of the switching elements, are reduced.

The reduction of losses when the module capacitors are switched from series to parallel connection enables the converter to be used as a backup transformer as well, for effectively converting DC and AC voltage to both raise and lower an input voltage. In this way, very small transformers can be constructed with very high power density—with correspondingly fast timing of the converter.

Since with a corresponding configuration of the modules charge balancing with modules even of an adjacent bridge branche is possible, use of the modules and intermediate modules according to the invention enable the configuration of entirely new topologies for multiphase current converters, since the previous function of a common DC voltage conductor rail with a defined intermediate circuit voltage is no longer necessary.

The use of the intermediate modules enables the voltages of individual module capacitors to be adapted even to individual requirements instead of voltage balancing, so that a corresponding converter can generate certain voltages directly, without further PWM. In particular, the charges of module capacitors can also be reversed so that additional charge is taken from a module capacitor with low charge in order to charge another module capacitor further.

BRIEF DESCRIPTION OF THE DRAWING

In the following, the present invention will be described in greater detail on the basis of preferred embodiments of the invention and with reference to the drawing, in which.

In the drawing, identical parts, components and arrangements are designed by the same reference signs.

DETAILED DESCRIPTION OF PREFERRED EMBODIMENTS

The invention is based on the notion that a current converter that is constructed from a consecutive connection of a plurality of modules of the same kind and in which the capacitors of the modules may be connected optionally in parallel or in series, should be configured such that the voltages of the capacitors are to be balanced with each other before they are connected in parallel.

Figure 1:
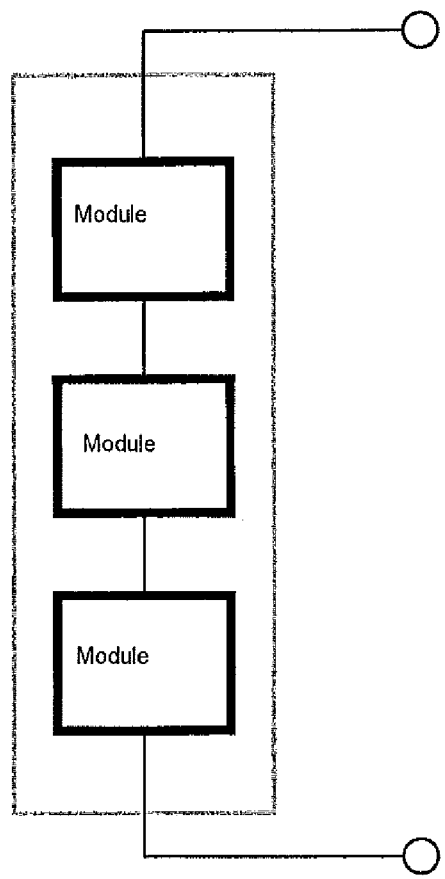
FIG. 1 describes a bridge branch of a modular multilevel converter according to the prior art comprising two identical two-terminal networks.

FIG. 1 shows a bridge branch of a modular multilevel converter, as described in greater detail in DE 102 17 889 A1, consisting of a plurality of two-terminal networks of the same kind, connected in series. Three two-terminal networks connected in series are shown here; however, there may also be two or any number of two-terminal networks connected in series. Each individual module functions as a two-terminal network and contains an energy storage element in the form of a capacitor, and multiple switching elements that are capable of taking up or giving off current for both voltage directions and thus reach all four quadrants of the current-voltage diagram.

Figure 2:
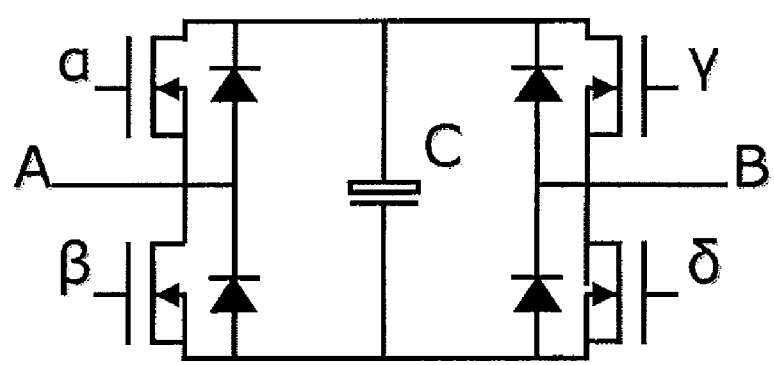
FIG. 2 shows a possible construction of an individual module of a modular multilevel converter according to the prior art.

FIG. 2 shows the possible internal structure of such a two-terminal element with four semiconductor switches, additional protective diodes and an energy storage capacitor.

Figure 3:
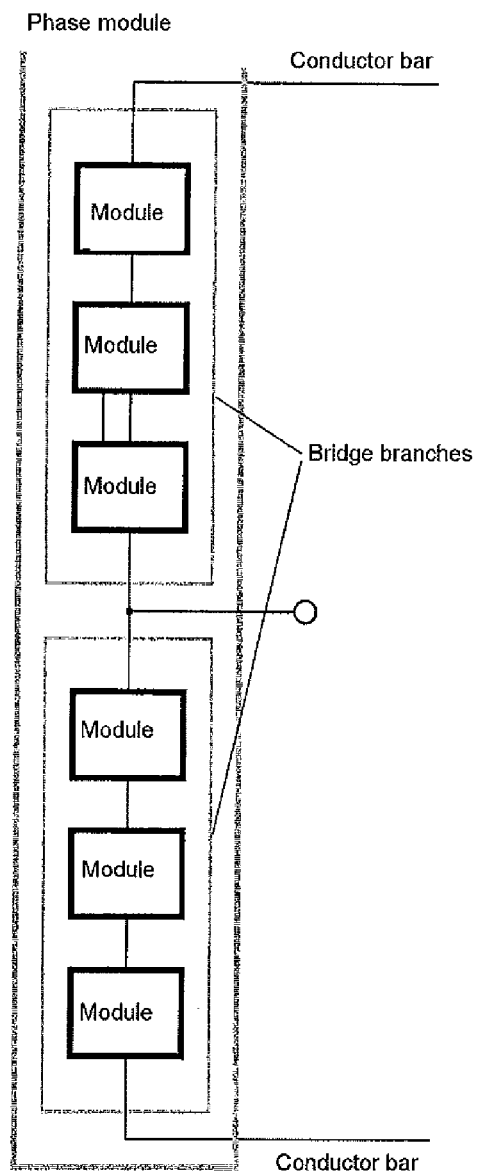
FIG. 3 shows a phase module of a modular multilevel converter according to the prior art, constructed from two bridge branches, each with two identical two-terminal networks.
Figure 4:
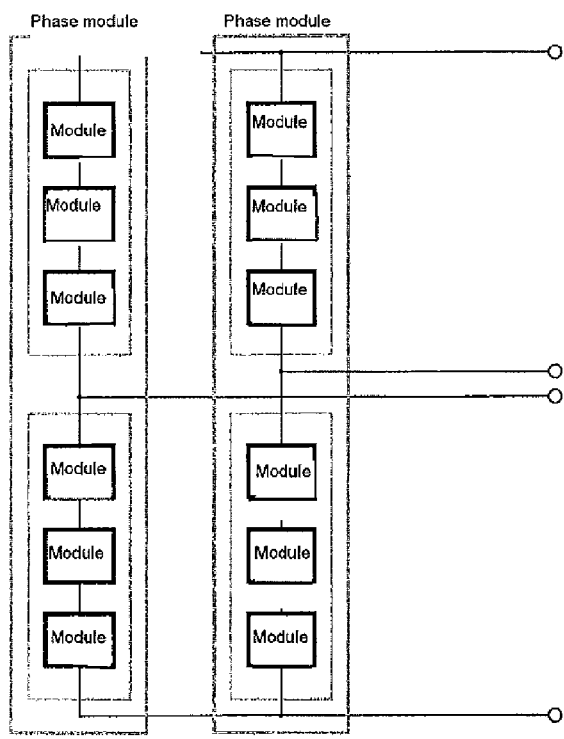
FIG. 4 shows a system consisting of two connected phase modules of a modular multilevel converter according to the prior art for converting a 1-phase AC voltage (or DC voltage) to another 1-phase AC voltage (or DC voltage)
Figure 5:
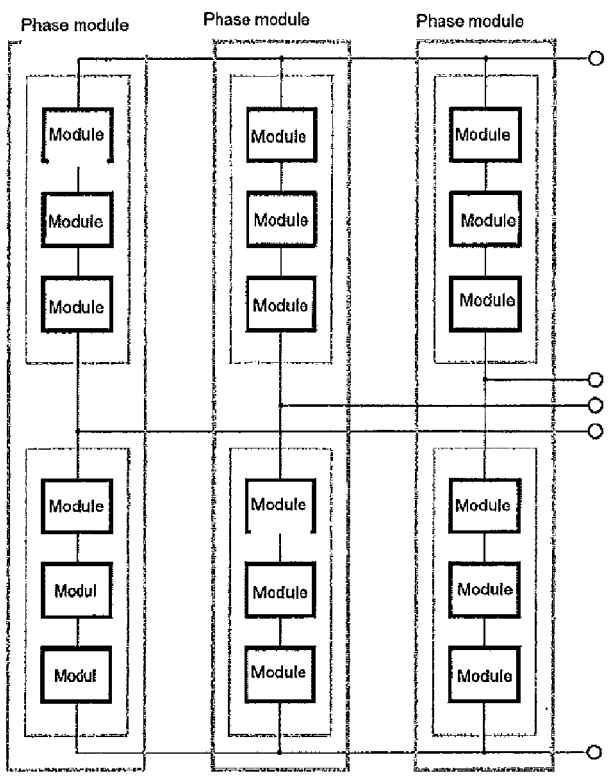
FIG. 5 shows a system consisting of three connected phase modules of a modular multilevel converter according to the prior art for converting a 3-phase AC voltage to a 1-phase AC voltage or a DC voltage.

FIG. 3 shows a phase module of a modular multilevel converter constructed from two bridges branches according to FIG. 1 and connected in series. Multiple phase modules can be connected to each other via the top and bottom conductor rails, while the middle connection is connected to one phase of a single-phase or multiphase AC network. In the same way, FIGS. 4 and 5 show the interconnection of two and three phase modules. With two phase modules, a single-phase AC voltage or a DC voltage can be transformed into another single phase AC voltage or a DC voltage. The interconnection of three-phase modules shown in FIG. 5 yields a system for transforming a 3-phase AC voltage into a 1-phase AC voltage or a DC voltage.

Figure 6:
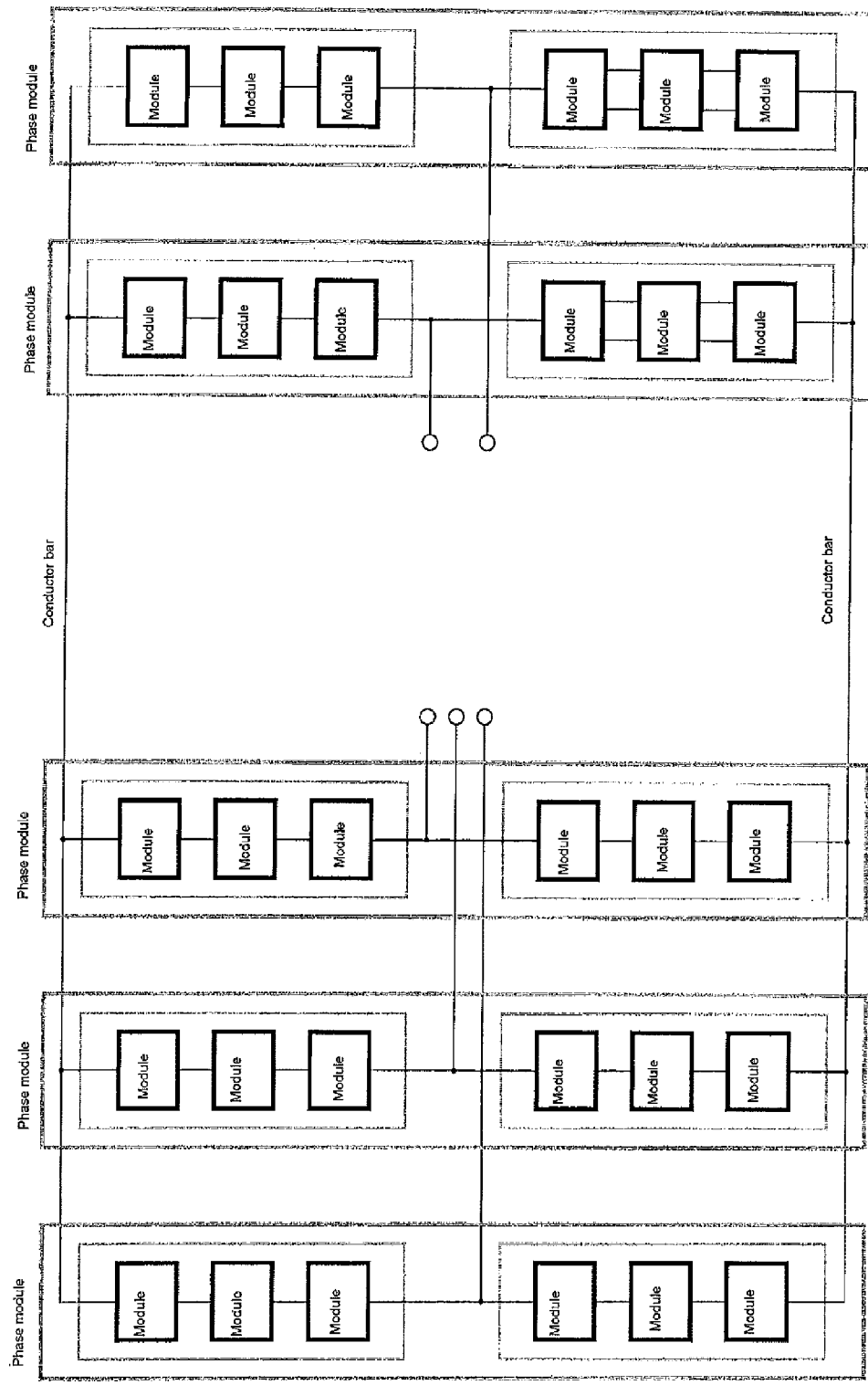
FIG. 6 shows a system consisting of three and two connected phase modules of a modular multilevel converter according to the prior art for coupling a 3-phase AC current network with a two-phase network.

Moreover, FIG. 6 is an exemplary illustration of the coupling of a three-phase power supply network with a two-phase network. Again, the energy flow of these two networks takes place across the two conductors of the conductor rail.

When modules that are configured for four-quadrant operation are used, such systems are configured completely symmetrically in respect of inputs and outputs, thus enabling full four-quadrant operation for each connection pair.

The invention described here is intended not only to improve the capacitor charge balancing needed for parallel connection, but also to introduce additional functionality at the same time. A converter block may be included as an additional component for this purpose. If small, low-voltage intermediate converter modules are added to the storage modules (generalised for this purpose), charges can be shifted along an entire chain with integrated voltage conversion with practically no loss. Consequently, even emptier modules may charge more fully ones according to the boost converter principle, or they can initiate a wave through the entire chain, from which the modules can draw a charge as needed or which can be simply passed on until it is reflected back by the last module for example.

In the following, the principle of charge balancing via intermediate modules will first be described with reference to certain converters, and then developed further in such manner that as few components as possible are required for said balancing function.

Figure 7:
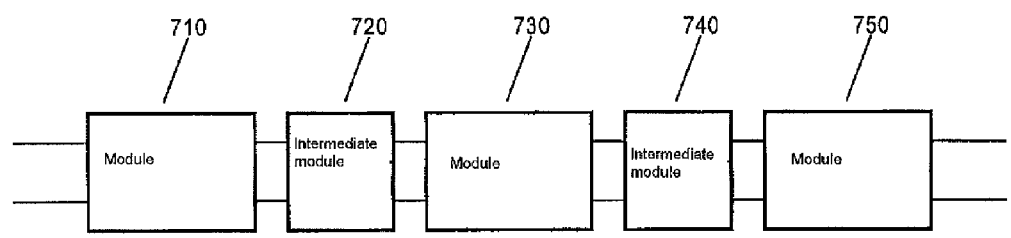
FIG. 7 shows a module structure consisting of modules and intermediate modules according to the invention.

Accordingly, FIG. 7 is a diagrammatic representation of a module structure according to the invention, in which an intermediate module 720, 740 is interposed between each of modules 710, 730, 750 of the converter. For this, at least two electrical connections are required between each module and the adjacent module, of which at least one passes through the intermediate module and optionally one or more direct connections exist between the modules. By definition, each of the modules stores energy in at least one module capacitor, and the intermediate modules comprise at least one energy storage means in the form of an inductor. Since energy transfer between the modules is clocked via the inductors, that is to say it takes place in portions, the energy content of the inductors may be significantly lower than the energy contained in the module capacitors.

Figure 8:
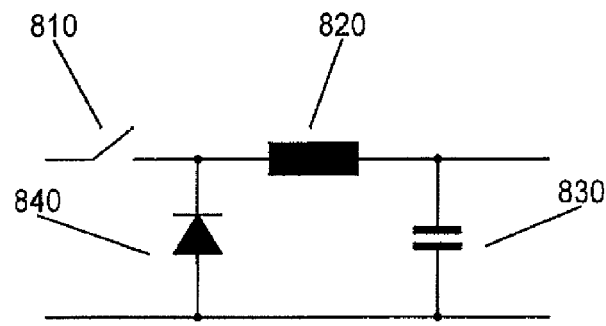
FIG. 8 shows a step-down converter.

In the simplest case, such a converter according to the invention may be created by using the existing modules of a modular multilevel converter that enable module capacitors to be connected in series or in parallel, and the converting system contains a clocked buck converter. An example of a variant is shown in FIG. 8. This converter consists of just a (semiconductor) switch 810, an inductor 820, a capacitor 830 and a diode 840. In principle, with this simple arrangement it is possible to carry out load balancing and minimise transfer losses (almost) at will. If the conductor rail voltage polarity is permanently defined by means of diodes, as is often used in modules that are capable of parallel connection, this converter can be integrated directly in the conductor rail.

Figure 9:
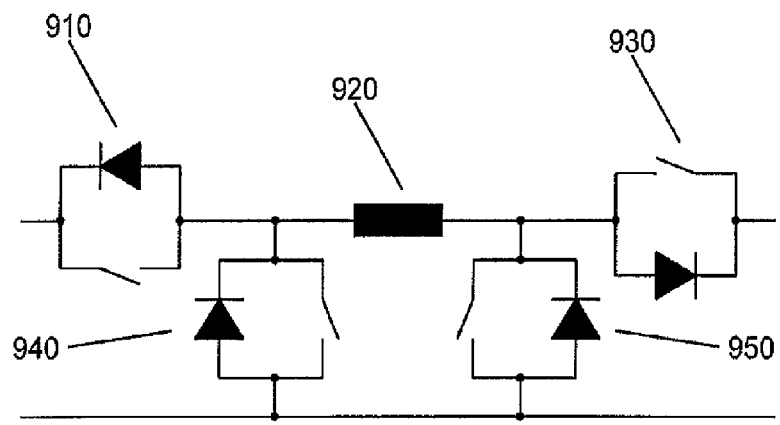
FIG. 9 shows a clocked converter that can be used both as a step-up and a step-down converter.

However, it is advisable to balance the load not only according to the above scheme, but also to incorporate a step-up converter and integrate it bidirectionally together with the step-down functionality. An example of such a circuit that may be used in this way is shown in FIG. 9. In this case, inductor 920 may be connected to a following module via two switch-diode combinations 910, 930 arranged in series with the connection or "trunk" lines and via two switch-diode combinations 940, 950 arranged in parallel thereto. The large requirement for extra components in this example is intended only for the sake of better understanding; ultimately, most parts can be combined, so that in reality only relatively few components are needed. However, the variant illustrated was not put together in this form without forethought, and it already manifests marked structural similarities with the modules that are used for preference. By this step, most of the elements are either shifted or their function is transferred to elements that already exist.

Figure 10:
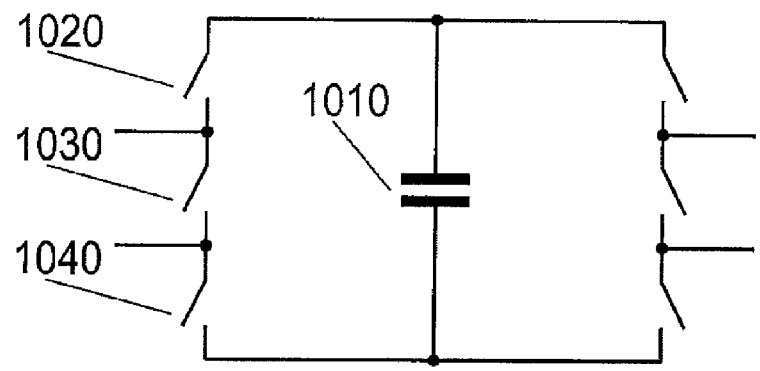
FIG. 10 shows a first preferred embodiment of a module, as may be used with additional intermediate modules in the converter according to the invention.
Figure 11:
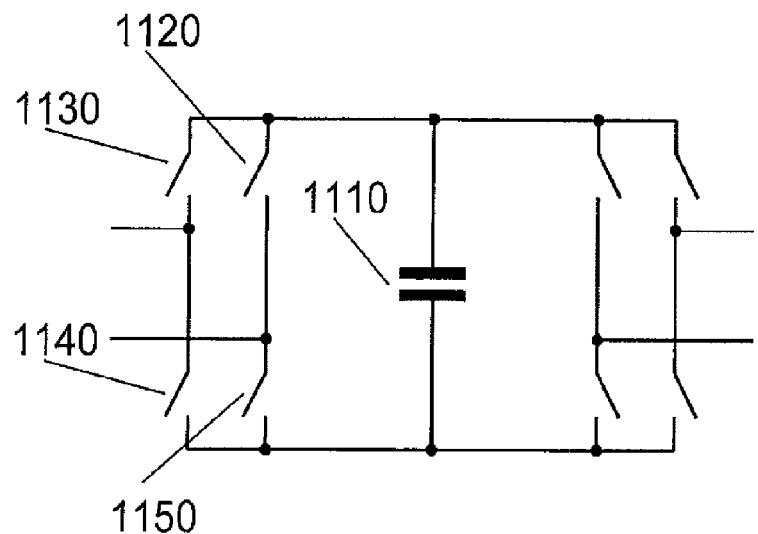
FIG. 11 shows a second preferred embodiment of a module, as may be used with additional intermediate modules in the converter according to the invention.

Now, as with the original topology suggested by R. Marquardt, the two module variants of the modular multi-level converter with series and parallel connection capability (FIGS. 10 and 11) can be used as a basis and combined correspondingly with the two intermediate voltage transformer variants presented here. FIG. 10 shows a module variant as a preferred embodiment of the invention, which is able to connect module capacitor 1010 to the adjacent module on each side thereof via 3 series-connected switches 1020, 1030, 1040 and two conductors. FIG. 11 shows a further variant, also a preferred embodiment of the invention, in which two conductors lead from module capacitor 1110 to each adjacent module. In this variant these lines are located in the middle of a first serial circuit consisting of two switches 1130, 1140 and a second serial circuit consisting of two switches 1120, 1150 respectively.

Figure 12:
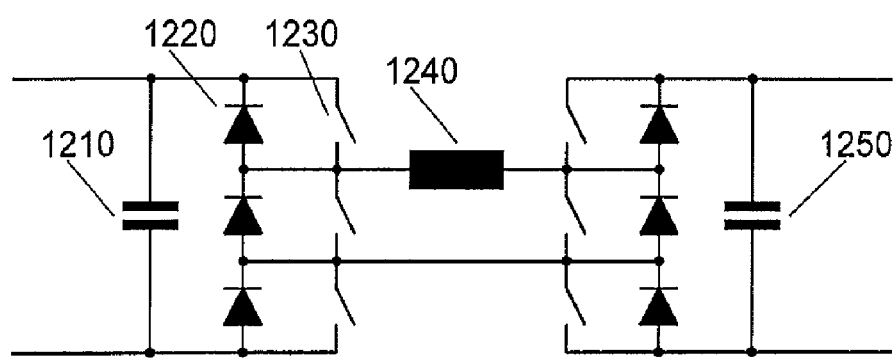
FIG. 12 shows the connection between two modules via an inductor as the intermediate module, wherein the modules are the same as those of the first embodiment and contain protective diodes in parallel with the switches.
Figure 13:
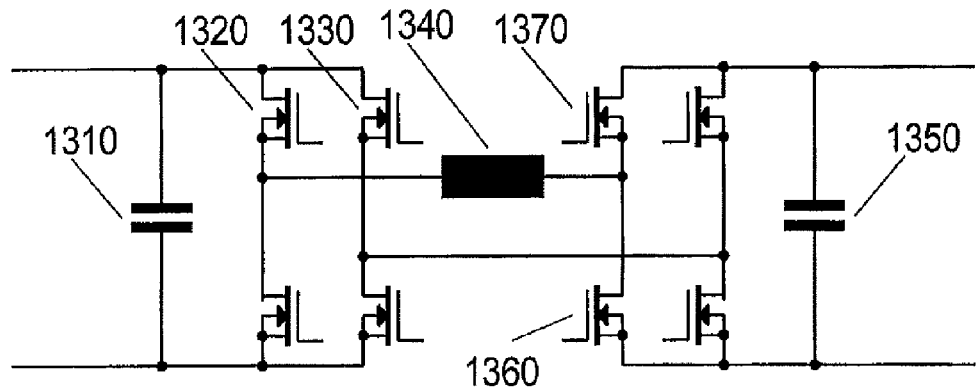
FIG. 13 shows the connection between two modules via an inductor as the intermediate module, wherein the modules are the same as those of the second embodiment and contain MOSFETs as switches.

The new (converter) intermediate module can now be installed either at the module outputs, that is to say between the current conductors, or clamped directly to the capacitor connections of each module. Only in the case of the original module, the connection to the respective storage capacitor appears to be the only practical variant because of the individual trunk line. The circuits created thereby can now be simplified by collocating parallel and serial switching elements so that the reduced variant assumes both functions. FIGS. 12 and 13 illustrate corresponding variants. Accordingly, FIG. 12 shows parts of adjacent modules according to FIG. 10 with a serial circuit 1230 of three switches, wherein diodes 1220 are connected in parallel to each. In this case, the intermediate module consists of just one inductor 1240. Energy can be transferred between module capacitors 1210 and 1250 via this inductor with the aid of the switches. The diode functions may also be shifted to the semiconductor switches, yielding an additional advantage to the effect that—depending on the semiconductor switch type—the forward voltage and thus also the losses can be reduced significantly.

FIG. 13 shows such an embodiment of two adjacent modules base on a module according to FIG. 11. In this case, two serial circuits 1320, 1330 each consisting of two n-channel MOSFETs, are shown instead of the switches. As in FIG. 12, here too the intermediate module consists of just one inductor 1340, since the MOSFETs fulfil the corresponding switching functions for exchanging energy between module capacitors 1310 and 1350. Now from the initially separate development, the actuation of this system also becomes clear. As a result of the symmetry of the capacitance tapping points, the position of the inductor can also be swapped as desired and, upon closer inspection of the circuit, the originally required restriction as to voltage direction between the two conductor rails or tapping points, may also be dispensed with.

A converter such as the one shown in FIG. 13 is now operated in the usual way for step-up and step-down converters. Step-down conversion is performed simply from the module with the higher voltage to the empty capacitor via a clocked parallel connection, with the increase in current being limited by the inductor. Step-up conversion is initiated by a current from the emptier capacitor—1310 for example—to earth through the inductor; when this path is shut off in transistor 1360, consequently on the destination side, energy transport is initiated from the inductor via the free-wheeling diode of upper transistor 1370 in to the fuller capacitor 1350 (although this reverse charging from the emptier capacitor to the fuller one is only used in special cases).

In the form described above, however, the system is primarily optimised for classic series operation and charge balancing between the modules. In keeping with the inductor, parallel switching is always associated with a low-pass characteristic that can be reduced to almost any level when load balancing and parallel switching are operating at different clock speeds; in order to reduce the inductance and still ensure that the energy flow through the intermediate voltage transformer is fast enough, the clock speed thereof must be increased accordingly. The lower time constant compared with the system speed of the converter thus no longer affects the parallel switching. Alternatively, two options are possible.

Figure 14:
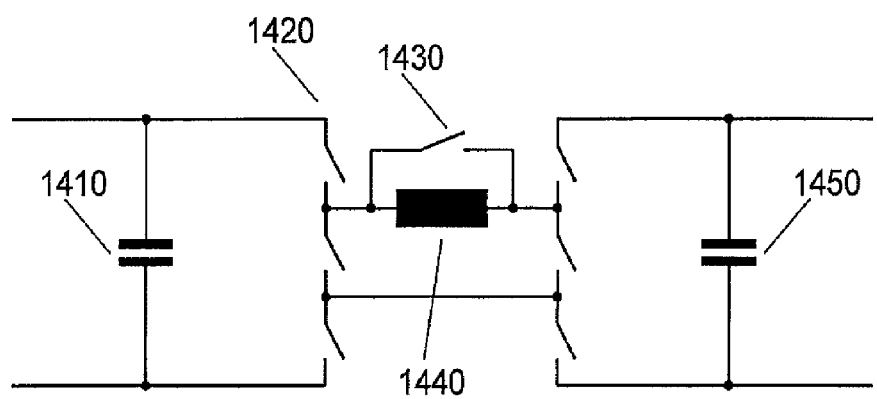
FIG. 14 shows the connection between two modules via an inductor with bypass switch as the intermediate module, wherein the modules are the same as those of the first embodiment.
Figure 15:
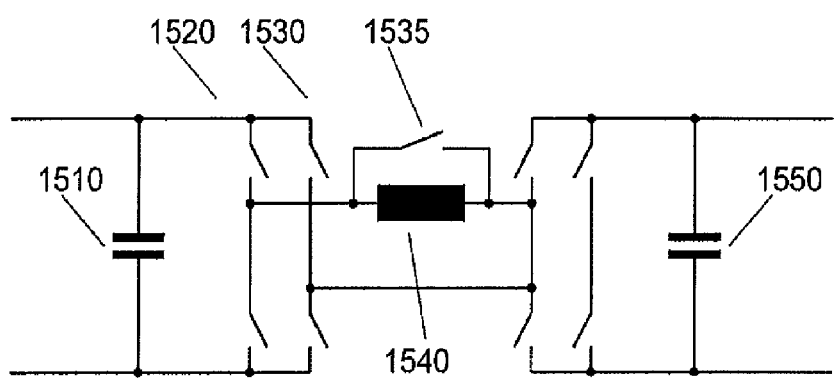
FIG. 15 shows the connection between two modules via an inductor with bypass switch as the intermediate module, wherein the modules are the same as those of the second embodiment.

On the one hand, the inductor can be extended over a switchable bypass path as shown in FIGS. 14 and 15, so that the inductor can be bridged. FIG. 14 shows modules having the same structure as in FIG. 10 with serial circuits 1420 of three switches. A bypass switch 1430 is positioned over inductor 1440, so that a connection can also be switched between module capacitors 1410 and 1450 without involving the inductor as well.

Correspondingly, FIG. 15 shows modules having the structure of FIG. 11, each with two serial circuits 1520, 1530 of two switches each on either side of the module. As in FIG. 14, here too the inductor 1540 may be bridged via a bypass switch 1535 to make a direct electrical connection between module capacitors 1510 and 1550. The additional complexity of these solutions, each having one additional switch, is relatively low, because it only needs to be designed with regard to its blocking capability of the maximum module voltage, and the current load is very small. In the switched state, this semiconductor forces an almost instantaneous current increase; after a short period—depending on the forward voltage of the switch used—the inductor takes on almost the entire charge flow. This topology makes deliberate use of the enormously high pulse overload capacity of power semiconductors (as a rule, purely Ohmic load behaviour is in evidence; for example, manufacturers have already declared short-time withstand currents of tenfold duration design to be unproblematical).

Precisely with a view to future developments in the field of power electronics, the fact that the derivation described in the preceding has yielded a very simple schema which may serve to create a more general module structure can be used to advantage. All of the functions discussed—and possibly others—can themselves be embedded modularly (and optionally). In this variant, the energy storage element is at the heart of each module. Now, a certain number of tapping points may be led out in each direction (to the usually two adjacent modules or corresponding intermediate converter modules), depending on the variant chosen above. However, hybrid variants are also possible. In the case of the variant shown in FIG. 11, each individual tapping point is configured as a push/pull stage, each having two switches. In the variant according to FIG. 10, the tapping points are integrated in a column. The latter version has the advantage of requiring fewer semiconductors, but conversely the column limits the states of the individual tapping points. On the other hand, an objection to the effect that the variant according to FIG. 11 requires many more semiconductors may be substantially rebutted, because a closer examination of the structure will reveal that almost all transistors may be usable at the same time for each switching state (of those discussed here), so that the current loads and losses may also be distributed correspondingly. The main difference between the original module of a multilevel converter with the option of switching the capacitors in series or in parallel is the breakdown of the four main transistors into a larger number of individual elements having a lower current resistance capacity and with separate actuation. Hybrid variants of serial circuits of modules according to FIGS. 10 and 11 are also possible.

According to this schema, almost any number of n-poles may now be placed between two converter modules, wherein a corresponding tapping point is created on the module capacitor on one of the two adjacent modules for each pole of the intermediate module. In most cases—as has been described in the preceding with regard to the buck-boost converter derived here—, the circuit of the intermediate module is also simplified by the removal of diodes or switching elements that might interfere with the switches on the tapping point. The direct interconnection of tapping points of one module with those of another is thus naturally also included. All previous modular multilevel converter module variants now fall within the terms of this principle.

Figure 16:
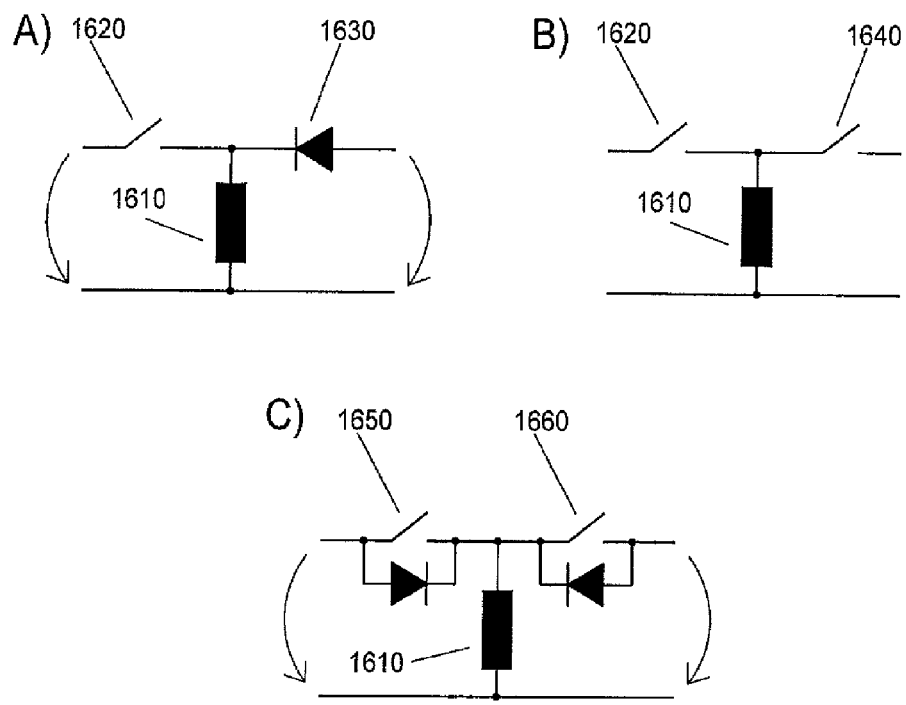
FIG. 16 shows various modifications of a buck-boost converter.

Based on the preceding explanation, the composition of modules with intermediate voltage transformers may now be extended and generalised. However, instead of the voltage transformer block assembled as above, which exploited the internal structure of the modules astonishingly well, the inverse transformer principle may now also be used. FIG. 16 shows just an example of a buck-boost converter, drastically simplified for illustrative purposes. FIG. 16 A) shows the combination of an inductor 1610 with a series circuit of switch 1620 and diode 1630. In FIG. 16 B), the diode has been replaced with another switch 1640. In FIG. 16 C), each of these switches has been replaced with a parallel circuit 1650, 1660 consisting of a switch and a diode to enable backward conductivity to be implemented.

Figure 17:
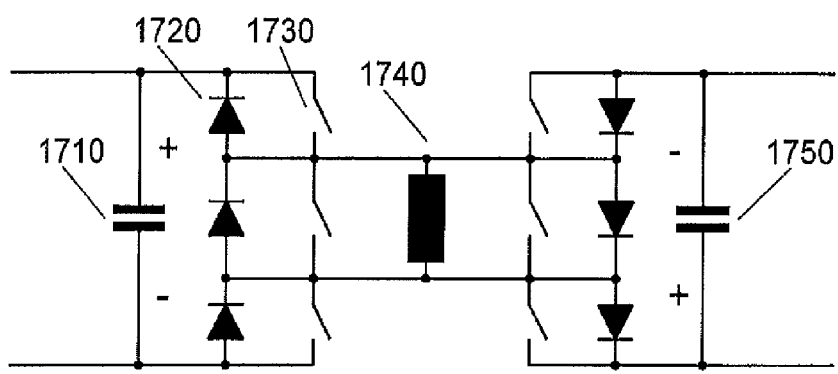
FIG. 17 shows the connection between two modules via an inductor according to the concept of a buck-boost converter as the intermediate module, wherein the modules are the same as those of the first embodiment.
Figure 18:
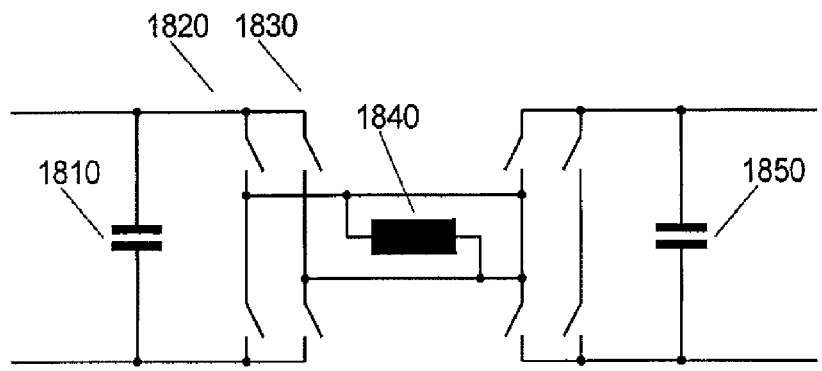
FIG. 18 shows the connection between two modules via an inductor according to the concept of a buck-boost converter as the intermediate module, wherein the modules are the same as those of the second embodiment.

In FIGS. 17 and 18, this buck-boost converter was switched directly into the modules. FIG. 17 shows a variant similar to FIG. 12, with series circuits each consisting of three diodes 1720 and three switches 1730, wherein here inductor 1740 is positioned between the parallel trunk lines between the modules. This enables a direct electrical connection to be established between module capacitors 1710 and 1750 without the need to include the inductor and without an additional bypass switch. In this context, the intermediate module is defined by the trunk lines, the inductor and four connection ports. FIG. 18 shows a variant similar to FIG. 13, but here series circuits 1820, 1830 of two switches each are represented instead of transistors. Similarly to FIG. 17, here too inductor 1840 is located between the parallel trunk lines that connect two adjacent modules. Accordingly, here too a direct electrical connection can be established between module capacitors 1810 and 1850 without a bypass switch. In this case, however, it is important that this system inverts the voltage from one module to the next, that is to say the capacitors are basically installed in the opposite direction in alternating modules. In the tapping point variant of FIG. 18, however, this no longer applies, here too it has no fixed polarity. However, this must be taken into account in the control, of course.

Both variants may now be expanded if applicable with a further tapping point. In this way, modules are created that can transport and charge energy in any direction with as little loss as desired, and are also able to cover the entire dynamic bandwidth in the classic connection (serial and parallel connection) without being braked by one of the inductors. This schema can be continued indefinitely with classic modules and/or without intermediate modules.

Viewed from a different perspective, ultimately a second module type, generally representing an n-pole element, has been introduced in this embodiment of the present invention. This may be practically any imaginable electronic system; in the present case—unlike the electrical basis storage module—a magnetic storage module is presented for exemplary purposes. It was even possible to design this completely passively (with regard to controller intervention, not the energy flow) by collocating all actuated parts with switches and so on of the base module, or at least transmitting them to it.

The result is extremely simple as a circuit, although the functionality is more easily understandable if the corresponding derivation is considered from the more complex, detailed version. Thus, again, the object receives its functionality only when actuated or "controlled".

Figure 19:
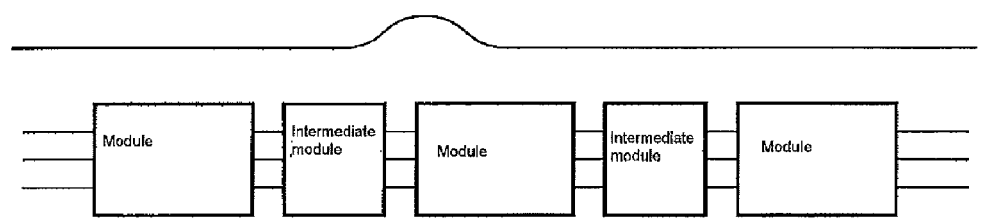
FIG. 19 shows a module structure consisting of modules and intermediate modules according to the invention and the balancing of charges between the modules.
Figure 20:
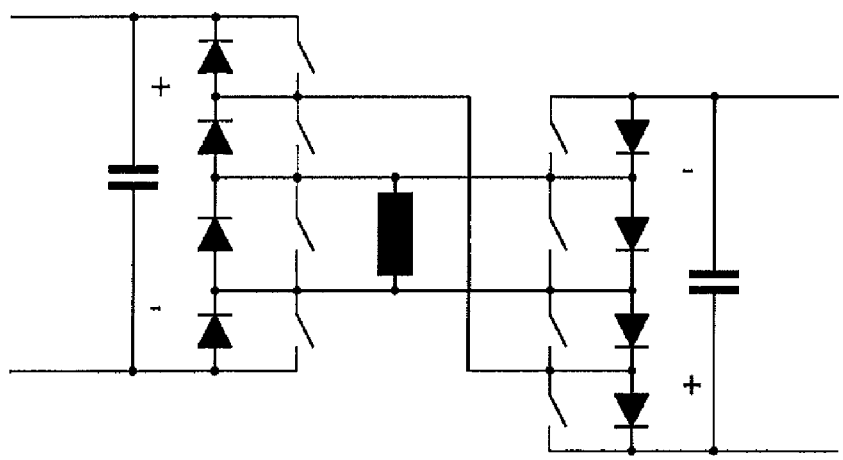
FIG. 20 shows a module structure based on the first embodiment, each with three points for tapping the adjacent module, protective diodes parallel to the switches and an inductor between the connection lines as the intermediate module.
Figure 21:
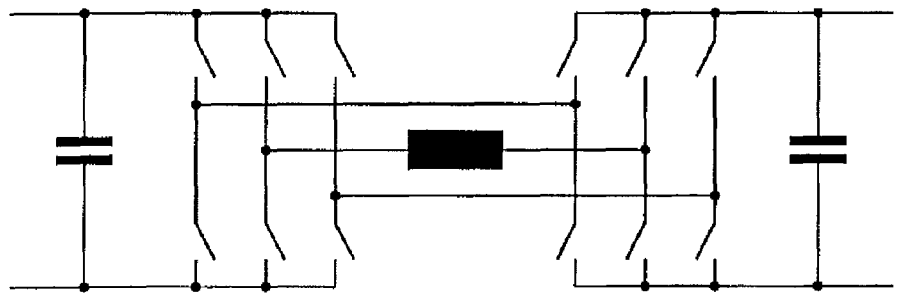
FIG. 21 shows a module structure based on the second embodiment, each with three points for tapping the adjacent module and an inductor in a connection line as the intermediate module.
Figure 22:
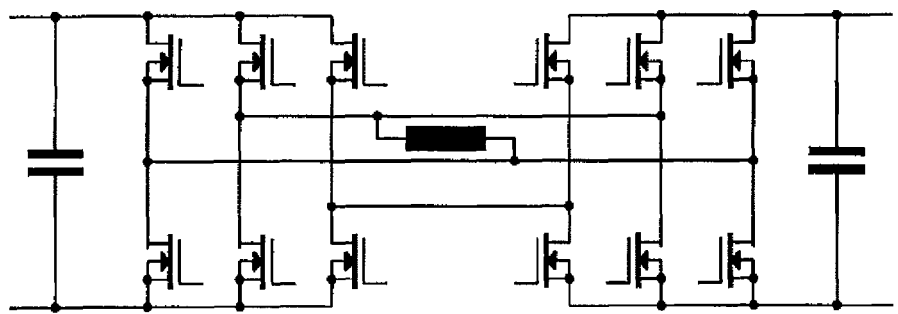
FIG. 22 shows a module structure based on the second embodiment, each with three points for tapping the adjacent module, MOSFETs as switches and an inductor between two connection lines as the intermediate module.
Figure 23:
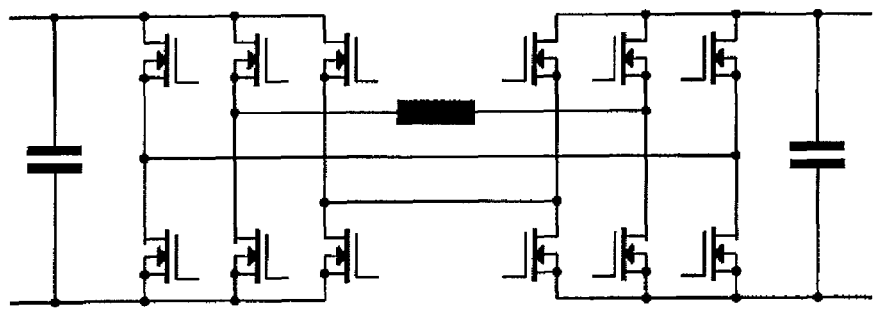
FIG. 23 shows a module structure based on the second embodiment, each with three points for tapping the adjacent module, MOSFETs as switches and an inductor in a connection line as the intermediate module.

For this purpose, the (electric) storage module was also generalised, and thus departed from the original topology: this too has now become an m-pole. With this change, charge flows well beyond simple module balancing are now possible with losses that may be as small as desired. This becomes clear in the option of a charge pump and culminates in the capability of inducing low-loss charge waves along the length of a module chain, which supplies any (electrical) module on the path with the surpluses, or covers the deficits with the output thereof. This is illustrated generally in FIG. 19.

In addition, it is now also possible for the first time to create and control widely differing module capacitances or even modules with different voltages very easily.

If the charge balancing control is to be decoupled from the actual operation, a further capacitor tapping point passing directly to the adjacent module via a conductor rail may also be introduced, as shown in the two variants of FIGS. 20 to 23. Since this allows a few switching elements to be omitted, this step is not excessively expensive.

The new system also offers the capability to depart from the usual four-column macrotopology (construction in phase modules) without having to sacrifice four-quadrant operation capability. Power can now also be transported beyond the modules. This opens a range of new application opportunities such as battery management in electric vehicles.

Alternatively—as described in the preceding—the voltage of the module capacitors may also be balanced in such manner by using special modules and a corresponding actuator that no additional intermediate modules are needed for this. Instead, the module capacitors are charged or discharged in ascending or descending order. In this context, however, the modules must also be designed in such manner that not only the optional serial or parallel connection can be made, but also individual module capacitors may be excluded from the connection. In this way, such modules may connect the modules that are adjacent to them on the right and left in such manner that the module capacitors thereof are connected in series or in parallel but their own module capacitor is not included in this circuit. In this case, therefore, a direct electrical connection may be created between a module and a module that is not immediately adjacent thereto, by skipping the interposed modules, wherein the direct electrical connection must be at least bipolar if a parallel connection of module capacitors is to be carried out by skipping the modules between them.

Figure 24:
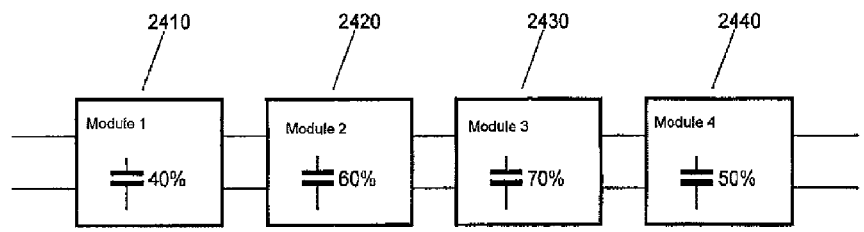
FIG. 24 shows a module structure consisting of modules according to the invention, which are configured in such manner that they are able to carry out charge balancing without using intermediate modules.

FIG. 24 shows a general module structure consisting of modules 2410, 2420, 2430 and 2440 according to the invention, which are designed such that they are able to carry out charge balancing without intermediate modules. For example, if a parallel connection of the module capacitors of all the modules shown in FIG. 24 is desired during one charging operation, the individual parallel switching operations must be carried out with due consideration for the corresponding charge states shown: initially, only the module capacitor of module 2410 is charged, since with 40% it has the lowest charge voltage, whereas the other module capacitors are not connected to the trunk lines of the modules via at least one connection. When the voltage in the module capacitor of module 2410 has risen to 50%, the module capacitor of module 2440 is connected in parallel, the module capacitors of modules 2420 and 2430 being skipped. Now, this parallel connection is charged until the voltage thereof has risen to 60%, so that the module capacitor of module 2420 can also be connected in parallel. Then, the three parallel-connected module capacitors of modules 2410, 2420 and 2440 are charged from 60% to 70%, so that the fourth module capacitor of module 2430 can be connected in parallel without corresponding charge inversion losses.

Figure 25:
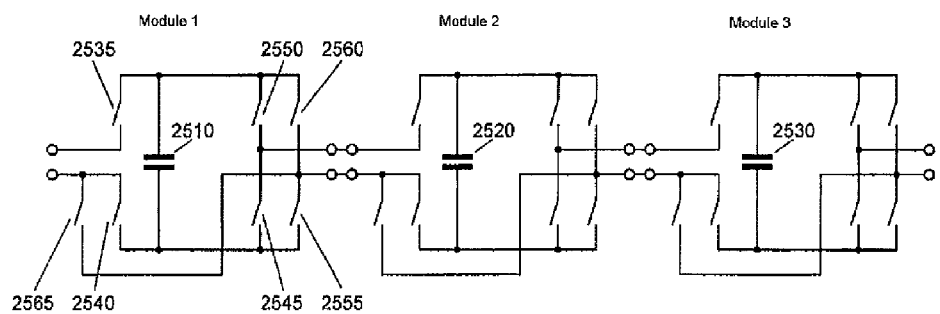
FIG. 25 shows a first embodiment of modules according to the invention which are able to carry out charge balancing without using intermediate modules.

FIG. 25 shows a first possible embodiment of modules according to the invention that enables load balancing between module capacitors 2510, 2520, 2530 without intermediate modules. In this case, the switches again represent any possible kind of suitable semiconductor switch; in particular, correspondingly polarised protective diodes may again be connected in parallel with these switches.

For example, the module capacitors can be connected in parallel if the respective switches 2535, 2540, 2550 and 2555 are closed on the modules. Each of the switches not mentioned are to remain constantly open in this case. Alternatively, the module capacitors may be connected in parallel with inverted polarity when switches 2535, 2540, 2545 and 2560 are closed.

A module may be skipped with simultaneous parallel connection when switches 2535, 2550 and 2565 are closed. When the module capacitors are connected in series, it is sufficient either to close only switches 2535 and 2550 (upper trunk line) or only switch 2565 (lower trunk line).

In addition, the individual module capacitors may be connected in series via the upper trunk line by closing switches 2535 and 2545. Alternatively, they may also be connected in series via the lower trunk line by closing switches 2540 and 2560.

Finally, module capacitors may also be connected in series in such manner that each capacitor is followed by a capacitor that is inverted compared to its predecessor, by closing switches 2535 and 2555. Switches 2540 and 2550 must then be closed correspondingly on the following module in each case.

Figure 26:
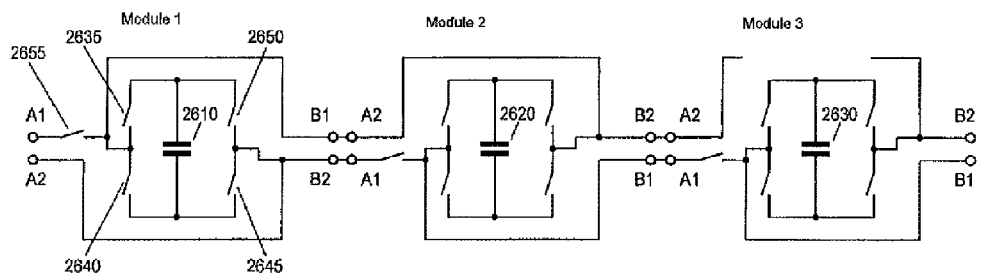
FIG. 26 shows a second embodiment of modules according to the invention which are able to carry out charge balancing without using intermediate modules.

FIG. 26 shows a second possible embodiment of modules according to the invention, which enables charge balancing between module capacitors 2610, 2620, 2630 without intermediate modules. In this case, the switches again represent any possible kind of suitable semiconductor switch; in particular, correspondingly polarised protective diodes may again be connected in parallel with these switches. Each of the modules of this embodiment must be connected for a chain connection in such manner that each of the upper and lower connections of a subsequent module is transposed relative to its respective predecessor.

In this context, parallel connection of the module capacitors may also be achieved if each of switches 2635, 2645 and 2655 or switches 2640, 2650 and 2655 are closed. All switches that are not mentioned are opened.

Closing switches 2635 and 2645 or switches 2640 and 2650 enables the module capacitors to be connected in series.

If only switch 2655 is closed, a module capacitor can be bridged during parallel connection of the adjacent capacitors on either side thereof.

Finally, a module capacitor can be bridged during series connection of the adjacent capacitors on either side thereof if switches 2635 and 2650 or switches 2640 and 2645 are closed.

A chain connection of such modules may then form a bridge branch, wherein the outer connections on the terminal modules in each case may either be joined together or a connection to the adjacent bridge branch may be extended.

The two embodiments of FIGS. 25 and 26 represent two possible embodiments of a converter with multilevel converter modules, which enables the module capacitors to be connected optionally in series or in parallel on the one hand, and on the other permits low-loss charge balancing among the module capacitors without the use of additional intermediate modules. However, the inventive idea may also be employed using other switch-capacitor configurations. In particular, the modules described according to FIGS. 25 and 26 may of course also be extended further by additional electrical connections between the respective modules that are included or not in the circuits.

The invention claimed is:

1. An electrical converter for power supplies, comprising at least two identical cascaded modules, wherein each module comprises at least one module capacitor for energy storage and switching elements, wherein the switching elements are able to switch the module capacitors of different modules both in series and in parallel, and wherein the modules are connected to each subsequent module in the chain of sequentially connected modules via at least two connections, wherein an intermediate module is connected between at least one module and a subsequent module in the chain of sequentially connected modules, which intermediate module has at least one inductor for energy storage, wherein the modules, the intermediate module and the switching elements are configured such that said one module and the second succeeding consecutively connected module can be connected to each other via the switching elements in such manner that one of the at least two connections of the one module is connected via the at least one inductor to the second following module in the module chain; and that an energy and charge transfer can take place between the module capacitors via the inductor of the intermediate module according to the principle of a switching converter.

2. The electrical converter according to claim 1, wherein the intermediate module consists of an inductor, and each of the modules comprises two series circuits consisting of three switching elements, wherein these series-circuits are arranged parallel with module capacitor and the two connection points between consecutive switches in a series circuit form the respective two terminals for connecting the module with the next of the cascaded modules, and wherein each first of these two terminals is connected directly to a terminal of the subsequent one of the cascaded modules, and each second of these two terminals is connected to the terminal of the subsequent cascaded module via a terminal of the inductor.

3. The electrical converter according to claim 1, wherein the intermediate module consists of an inductor, each of the modules has four series circuits each consisting of two switching elements, wherein said series circuits are aligned parallel with the module capacitor and one connecting point of each of the switches of two of the series circuits forms one of two terminals of a module for connecting the next in the cascaded modules, and wherein the first of each of said two terminals is connected directly to a terminal of the subsequent one of the cascaded modules, and the second of each of said two terminals is connected to the terminal of the subsequent cascaded module via a terminal of the inductor.

4. The electrical converter according to claim 1, wherein the switching elements of each module are designed such that an electrical connection can be created across a group of one or more modules, from a module immediately to the left of the group to a module immediately to the right of the group in such a manner that the one or more module capacitors of the group is/are not charged or discharged.

5. The electrical converter according to claim 1, wherein the at least two identical cascaded modules form a bridge branch with two external power terminals, wherein the voltage at these outer power terminals is obtained from the voltage of all the module capacitors connected in series or parallel.

6. The electrical converter according to claim 5, wherein two series-connected bridge branches each form a phase module of a single-phase or multi-phase power converter.

7. The electrical converter according to claim 1, wherein the switching elements are embodied as bipolar transistors, IGBTs, MOSFETs, thyristors or GTOs.

8. The electrical converter according to claim 1, wherein diodes are also aligned parallel with the switching elements, and the diodes are connected such that they protect the switching elements from polarity reversal and overvoltage.

9. The electrical converter according to claim 1, wherein the converter operates according to the principle of pulse width modulation and changes the current strength via the pulse width modulation duty cycle.

10. The electrical converter according to claim 1, wherein the converter further comprises a measuring circuit which measures the voltage values of each of the module capacitors.

11. An electrical converter for power supply, comprising at least two identical cascaded modules, wherein each module comprises at least 4 terminals and at least one module capacitor for energy storage, and the modules include switching elements, and wherein the switching elements can switch the module capacitors of the modules both in series and in parallel, wherein the switching elements of the modules are designed such that the module capacitors of modules, that are to be connected in parallel can be actuated in order during operation, starting with a first module capacitor, wherein said actuation of the modules comprises the following steps:

selecting the module capacitor among the module capacitors for the planned parallel connection that has the lowest voltage as the first module capacitor when a load current through the inverter charges said module capacitor, or selecting the module capacitor that has the highest voltage as the first module capacitor when a load current through the inverter discharges said module capacitor;

selecting a module capacitor to be connected in parallel with the second lowest voltage when a load current through the inverter charges the first module capacitor, or selecting a module capacitor to be connected in parallel with the second highest voltage when a load current through the inverter discharges the first module capacitor;

connecting said selected module capacitor to be connected in parallel to the first module capacitor, when the load current through the converter has charged or discharged the first module capacitor to the point that it has the same voltage as the selected module capacitor for connection in parallel; and repeating the previous two steps until all module capacitors that are to be connected in parallel have been connected in parallel with each other.

12. The electrical converter according to claim 11, wherein the modules each comprise two series circuits of two switching elements, aligned parallel to the module capacitor, wherein the centers of said series circuits form two connections between the module and the first adjacent module, wherein in addition two further connections between the module and the second adjacent module are also each formed via a further switching element to the terminals of the module capacitor, and wherein a connection from a terminal to the first adjacent module is formed to a terminal to the second adjacent module via a further switching element.

13. The electrical converter according to claim 11, wherein the modules each comprise two series circuits consisting of two switching elements aligned parallel with the module capacitor, wherein the terminals to the first adjacent module are connected directly with the center points of said series circuits, and wherein one of the terminals to the second adjacent module is connected to one center point of said series circuits directly and the other is connected to the other center point via a further switching element.

14. The electrical converter for power supply according to claim 11, wherein the modules are designed such that the module capacitor of a module that is not immediately adjacent to the first module capacitor can be connected in parallel without the one or more module capacitors of modules there between being connected to the first module capacitor in parallel or in series.

15. The electrical converter for power supply according to claim 11, further comprising a control circuit which is able to bring the measured voltages of the module capacitors into an order allocated to the modules, and also actuates the modules in such manner the chronological sequence of connection in parallel of module capacitors as described above can be carried out.

16. A method for controlling a converter for power supply, wherein the converter comprises at least two identical cascaded modules, and wherein each module comprises switching elements and at least 4 terminals and at least one module capacitor for energy storage, and wherein further an intermediate module is connected between at least one module and a subsequent one of the cascaded connected modules, which intermediate module has at least one inductor for energy storage, wherein the method comprises the following steps:

selecting a setting of the switching elements of a module so that optionally either a direct electrical connection is created via at least one of the terminals thereof from a first module adjacent to the module to a second module adjacent to the module, or so that the module capacitor of the module is connected in series to a module capacitor of an adjacent module via a terminal, or that the module capacitor of the module is connected in parallel to a module capacitor of an adjacent module via two terminals; and controlling the switching elements such that an energy and charge transport can be performed between the module capacitors via the inductor of the intermediate module according to the principle of a switching converter, so that voltages of module capacitors to be connected in parallel are brought to the same value before the parallel connection is made.

17. A method for controlling a converter for power supply, wherein the converter comprises at least two identical cascaded modules, and wherein each module comprises switching elements and at least 4 terminals and at least one capacitor module for energy storage, wherein the method comprises the following steps:

selecting a setting of the switching elements of a module so that optionally either a direct electrical connection is created via at least one of the terminals thereof from a first module adjacent to the module to a second module adjacent to the module, or so that the module capacitor of the module is connected in series to a module capacitor of an adjacent module via a terminal, or that the module capacitor of the module is connected in parallel to a module capacitor of an adjacent module via two terminals; wherein the parallel connection of module capacitors that are to be connected in parallel is carried out during operation of the converter and in order starting with a first module capacitor, wherein this actuation of the modules includes the following substeps:

From the module capacitors of the intended parallel connection, selecting the module capacitor with the lowest voltage as the first module capacitor when a load current through the converter charges this module capacitor, or selecting the module capacitor with the highest voltage as the first module capacitor when a load current through the converter discharges this module capacitor;

Selecting a module capacitor to be connected in parallel that has the second lowest voltage when a load current through the converter charges the first module capacitor, or selecting a module capacitor to be connected in parallel that has the second highest voltage when a load current through the converter discharges the first module capacitor;

Connecting this module capacitor intended for parallel connection in parallel with the first module capacitor when the load current through the converter has charged or discharged the first module capacitor to the point that is has the same voltage as the module capacitor that is to be connected in parallel; and Repeating the preceding two steps until all module capacitors that are to be connected in parallel have been connected in parallel to each other.

* * * * *